United States Patent [19]
Konig

[11] Patent Number: 6,050,798
[45] Date of Patent: Apr. 18, 2000

[54] ROTARY TABLET PRESS

[75] Inventor: Dietmar Konig, Köln, Germany

[73] Assignee: Kilian & Co. GmbH, Cologne, Germany

[21] Appl. No.: 09/095,794

[22] Filed: Jun. 11, 1998

[30] Foreign Application Priority Data

Jul. 23, 1997 [DE] Germany .......................... 197 31 514
Aug. 6, 1997 [DE] Germany .......................... 197 33 969

[51] Int. Cl.[7] ................................................ B29C 43/08
[52] U.S. Cl. ............................ 425/3; 425/214; 425/345; 425/353; 425/DIG. 33
[58] Field of Search ................................ 425/3, 214, 345, 425/353, DIG. 33

[56] References Cited

U.S. PATENT DOCUMENTS

| | | | |
|---|---|---|---|
| 4,570,229 | 2/1986 | Breen et al. ............................. | 425/149 |
| 4,817,006 | 3/1989 | Lewis ..................................... | 425/170 |
| 5,322,655 | 6/1994 | Ebey ...................................... | 264/40.5 |

Primary Examiner—Harold Pyon
Assistant Examiner—Mark A. Wentink
Attorney, Agent, or Firm—Bauer & Schaffer, LLP

[57] ABSTRACT

A rotary tablet press has a rotating mold table and top and bottom plungers, which can move reciprocally in plunger guides, coaxially with the molds. The reciprocating motion of at least the bottom plungers is cam-controlled and these plungers are acted upon by a damping element to prevent an overshoot of their movement. To ensure an action which is as free from wear and is as maintenance-free as possible whilst maintaining constant damping of the bottom plungers, it is proposed according to the invention that the damping element consists of at least one magnetic element which acts on the plungers.

12 Claims, 2 Drawing Sheets

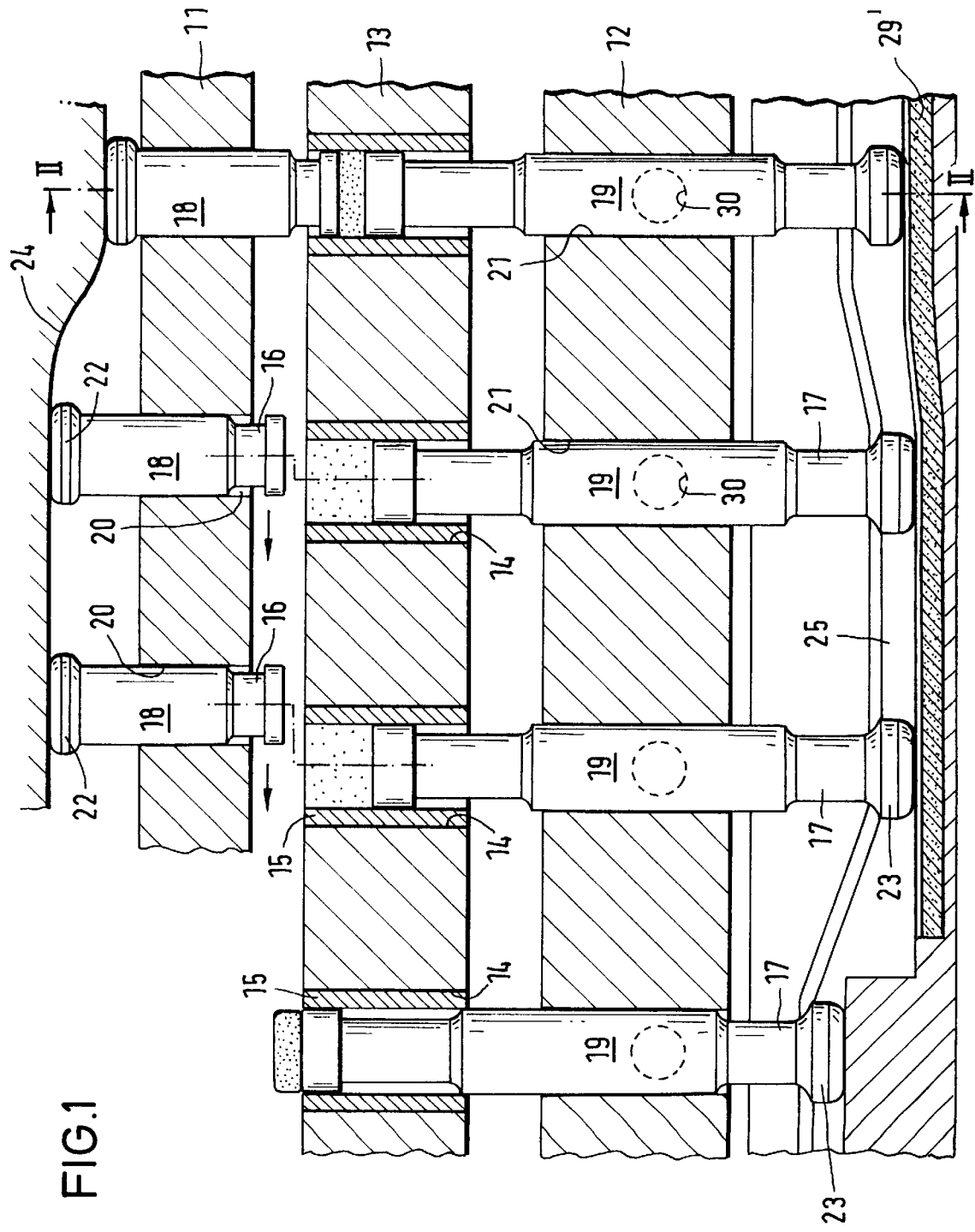

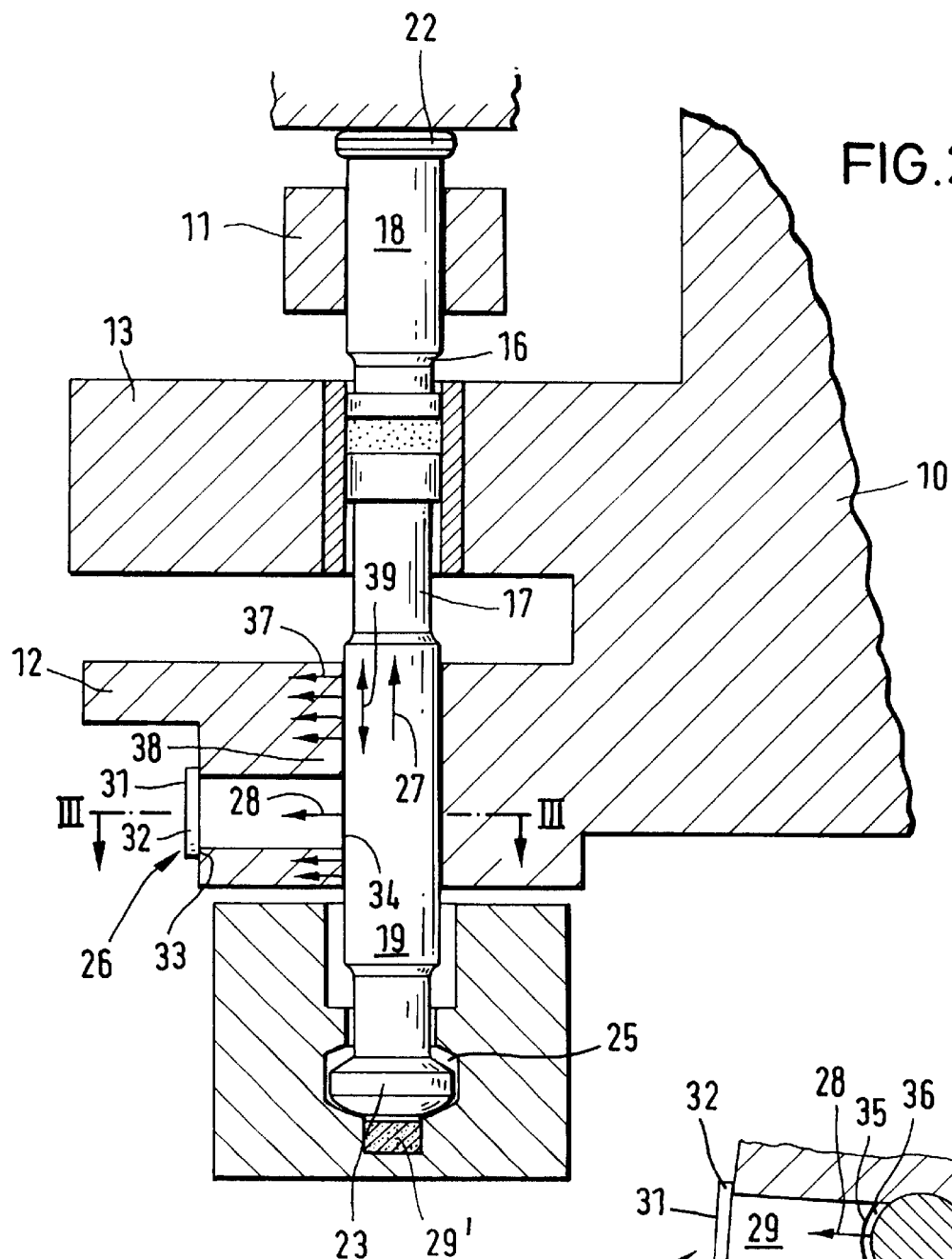
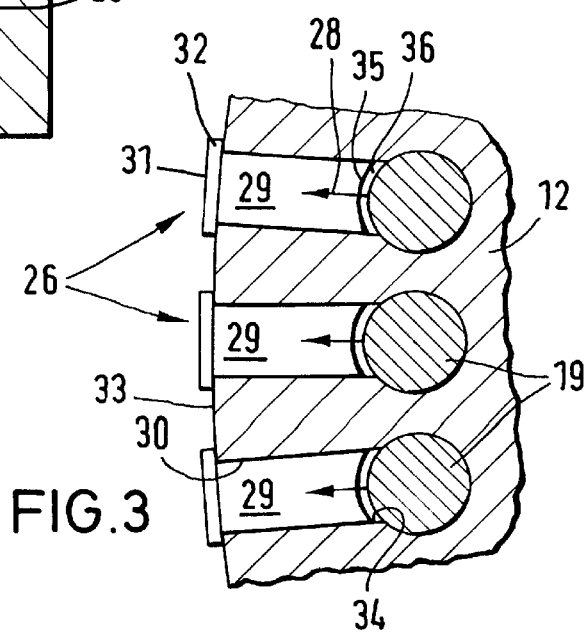

ROTARY TABLET PRESS

FIELD OF THE INVENTION

This invention relates to a rotary tablet press having a rotating mold table and top and bottom plungers, which can move in plunger guides, coaxially with the molds and with the execution of a stroke, wherein at least the bottom plungers are cam-controlled for the execution of their stroke and return stroke and are acted upon by a damping element to prevent an overshoot of their stroke or return stroke movement.

BACKGROUND OF THE INVENTION

When tablets are pressed in rotary tablet presses, the weight of the tablets to be produced is determined by the filling volume of the powder which is to be compacted and which is introduced into the molds. It is therefore important that the molds, which are closed at the bottom by the bottom plungers, always receive the same powder volume before pressing. The bottom plungers, which are raised and lowered by a plurality of control cams during the rotation of the rotating mold table, are subjected to considerable forces of acceleration during these vertical movements. Since it has hitherto been practically impossible in terms of production technology to achieve cooperation between the plungers and the control cams which is free from play, it is necessary to use a damping element with the plungers in order to prevent an overshoot of their stroke movement, namely to prevent lift-off of the plunger from the control cam, which would otherwise result in inaccuracies in the degree of filling and thus in the weight of the tablets to be pressed.

In the past, what are termed brake pins have been employed as damping elements. These are inserted in a transverse bore leading into the plunger and are pressed against the respective plunger by a pressure spring via an adjustable pressure plate, and thus exert a force on the plunger which is oriented transversely to the direction of movement thereof, due to which the frictional force is increased between the plunger guide and the plunger which is movable therein. In a similar manner, it is also possible to use a spring pressure piece, such as those which are frequently used for snap-in locking devices and which are obtainable as standardised components, to each plunger. This spring pressure piece is then likewise disposed in a transverse bore leading into the plunger guide, and its spring-loaded pressure head presses against the plunger transversely to the direction of movement thereof, so that the plunger is subjected to damping during its vertical movement as a consequence of the frictional force which results from this.

These known solutions have the disadvantage that it is very difficult exactly to adjust the prestress of the spring and thus the transverse force which is exerted on the plunger, in order firstly reliably to prevent overshoot of the plunger during its stroke movement and secondly to keep the frictional forces between the plunger guide and the plunger shank as low as possible, so as to prevent unnecessary wear. The adjustment of the spring stress, which is usually made by means of a screw, is seldom maintained for long, as a consequence of the vibration of the machine, so that it may become necessary, even after relatively short machine running times, to readjust these mechanical damping elements. On large tablet presses in particular, which not infrequently comprise more than 50 molds and a corresponding number of bottom plungers, the adjustment of so many damping elements is very time-consuming. Moreover, these damping elements have the particular disadvantage that they generally have to be removed completely in order to dismantle the plungers, since otherwise the brake pin which presses against the plunger can engage in an undercut located on the plunger when the latter is withdrawn and thus makes complete removal impossible.

In order to reduce the time necessary for the removal, installation and adjustment of the large number of damping elements described above, it has also already been proposed that an encircling groove for the bottom plungers be provided on the periphery of the mold table in the region of the plunger guides, wherein the plungers project laterally by a slight extent beyond the base of the groove. A tensionable brake band, which can be fixed or loosened by means of a simple band clamp, is disposed in the groove, and in its installed state its inner peripheral face presses against the plungers and thus effects a damping of the movement thereof. This design does in fact have the advantage that it can rapidly be removed for the dismantling of the plungers and can be re-installed rapidly after they have been installed. However, it does not ensure that the requisite frictional or damping force, which should be as constant as possible, is exerted on each plunger.

SUMMARY OF THE INVENTION

The object of the present invention is to provide a rotary tablet press with a damping mechanism for the cam-controlled plungers which is free from wear and is maintenance-free, and which nevertheless ensures a substantially constant damping of all the plungers. This object is achieved by the invention in that the damping element includes at least one magnet element which acts on the plungers. In a preferred embodiment, the magnet element(s) acts or act on the plungers transversely to the direction of movement thereof.

Therefore, with this design according to the invention, the transverse force which acts on the individual plungers and which increases the friction in the plunger guide is no longer exerted mechanically by contact on the plungers as a result of a spring force or a force of a prestress, but is exerted with the aid of a magnet, which pulls the plunger towards the plunger guide wall and which thus gives rise to a damping effect as a result of an increased frictional force. The magnetic forces which are thereby exerted on the individual plungers do not alter, even after long machine running times and severe machine vibrations, since the forces exerted by the magnets on the plungers depend only on the magnetic strength and on the gap between the magnet and the plunger, and in practice these quantities do not change during the operation of the machine. When a plunger is installed and removed, the associated magnet element does not have to be removed, since it does not project into the plunger guide and thus cannot impede installation or removal.

A separate magnet element is preferably assigned to each bottom plunger, and is advantageously disposed in a transverse bore on the mold table, which leads into the plunger guide. However, it is also possible to provide an encircling groove on the mold table, the depth of which extends as far as the plunger guides, and into which one or more magnet elements project in the regions of the control cam in which the plungers experience their up and down movements and thus their vertical accelerations. The magnet element(s) does/do not then rotate with the mold table and the plungers, but is/are fixed to suitable supports. The magnets can also of course be bar magnets of rectangular cross-section, which are then advantageously counter-sunk in grooves on the upper surface or underside of the plunger guide ring.

In one preferred embodiment of the invention, the magnet element substantially consists of a permanent magnet. Magnets of this type can be obtained inexpensively as standard components, even with high magnetic strengths, which can easily fall within the range from 50 to 500 Newtons.

The magnet element(s) can be disposed so that a gap remains between the magnet and the plunger on which it acts. This is particularly advantageous if the magnet element is not inserted in the transverse opening in the mold table until the plunger guide has been fabricated to a high accuracy. Of course, when fabricating the mold table it is also possible first of all to produce the transverse opening(s) on the peripheral face thereof and to insert the magnet therein, and then to drill the plunger guide(s), wherein part of the magnet element or magnet elements is drilled out simultaneously, and thus form a face with the plunger guide without a transition. By employing this procedure, the front end of the magnet element which points towards the plunger is therefore accurately matched to the peripheral face of the plunger, whereby a particularly high force can act on the plunger.

The magnet element or magnet element(s) may comprise an electromagnet or may consist of an electromagnet. If the magnet element(s) consists/consist of an electromagnet, the force exerted on the plunger can be increased or decreased by varying the current, or the damping force can be removed completely by switching off the magnet or magnets. It is also possible to provide a combination of permanent magnets and electromagnets for adjusting the magnetic force, wherein the electromagnets superimpose a stray field on the magnetic field produced by the permanent magnets and can thus increase or decrease the magnetic field.

Particularly if the magnet element is to be retrofitted in a mold table which is already provided with finished plunger guides, for example when retrofitting machines which were previously provided with mechanical contact pressure means, the magnet element is advantageously provided with a protruding stop collar at its rear end remote from the plunger. It is thus ensured that the magnet is not inserted too deeply in the transverse bore on the mold table and thereby projects into the plunger guide. The magnet element is advantageously detachably fastened in the associated transverse opening in the mold table, due to which is can easily be replaced by another magnet, for example if a magnet with a greater or lesser magnetic force is to be installed.

In one particularly advantageous further embodiment of the invention, the magnet element is disposed in the region of the control cam and acts on the plunger in the direction of movement of the plunger. In this embodiment, each plunger is therefore pulled downwards or upwards against the control cam by the magnet element, and is seated free from play against the control cam even when there are considerable forces of acceleration in the vertical direction. Therefore, in this embodiment not only is the frictional force in the plunger guide increased, but lift-off of the plungers is directly prevented by means of the magnetic control cam.

It is also possible for the magnets to be located not on the plunger guide or on the control cam but on the plungers themselves. In this embodiment, all the plungers are therefore themselves magnetic or are provided with magnets. The magnets are then preferably disposed in transverse bores in the plungers. This embodiment has the advantage that plungers of different diameters, which are used for the production of tablets of different sizes, can be equipped with magnets which have magnetic forces of different magnitudes, which then always give rise to the optimum damping which is matched to the plungers used.

Other features and advantages of the invention follow from the description given below and from the drawings, wherein a preferred embodiment of the invention is illustrated in more detail by way of example.

BRIEF DESCRIPTION OF THE DRAWINGS

FIG. 1 is a portion of a developed view of a mold table for a rotary tablet press in the region of the pitch circle passing through the molds;

FIG. 2 is a section along line II—II of FIG. 1 through a portion of the mold table in the region of a bottom plunger; and FIG. 3 is a section along line III—III through the subject of FIG. 2.

DETAILED DESCRIPTION OF THE EMBODIMENT

In the drawings, reference numeral 10 denotes a mold table of a rotary tablet press, which rotates horizontally with a main shaft, which is not illustrated, and which comprises a top plunger guide ring 11 and a bottom plunger guide ring 12, which are attached rotationally fixed to each other. The bottom plunger ring 12 bears the mold plate 13 at its top edge, in which mold plate the mold bores 14 in which the molds 15 are seated are situated in a circle. In the mold table, top plungers 16 are disposed in the top plunger guide ring 11 and bottom plungers 17 are disposed in the bottom plunger guide ring 12, coaxially with the molds 15. The plunger shanks 18 and 19 are guided so that they can move up and down in plunger guides 20 and 21, respectively.

A top plunger 16 and a bottom plunger 17 are assigned to each mold 15. The top ends 22 and bottom ends 23 of the plungers slide in sliding rails 24 and 25, respectively, which as control cams control the upward and downward movement of the plungers 16 and 17 when the press rotates.

As a result of the high speeds of rotation of the mold table, the plungers 16 and 17 are subjected to considerable accelerations in the vertical direction as they travel along the sliding rails 24 and 25 which control the lifting movement. Despite these high forces of acceleration, the bottom plungers 17 in particular have to be prevented from lifting off from their control cams, since otherwise a constant degree of filling of the molds 15 with tablet powder could not be achieved and the requisite constancy of weight would not be achieved as a result of this. Since the sliding rails 25 which serve as control cams cannot be fabricated precisely enough so that they ensure guidance of the bottom plungers without play, each bottom plunger 17 is provided with a damping element 26, which exerts a transverse force 28 on the plunger transversely to the direction of movement 27 thereof, as a result of which the plunger is pulled against the plunger guide in the plunger guide, which gives rise to an additional frictional force 37 between the plunger and then plunger guide. This frictional force 37 is sufficient to prevent overshooting of the bottom plunger, i.e. to prevent lift-off from the respective control cam 25. As can be seen in FIGS. 2 and 3, the individual damping elements 26 consist of permanent magnets 29 with a round cross-section, which are inserted in transverse bores 30 which are disposed on the peripheral face of the mold table 10 and which extend as far as the plunger guides 21. The magnets 29 are provided at their rear ends 31 with a protruding stop collar 32, which strikes against the peripheral face 33 of the bottom plunger guide ring 12 and thus ensures that the magnet cannot be inserted too deeply in the respective transverse bore 30. Each magnet is provided at its front end with a concave recess 35, the radius of curvature of which corresponds to half the diameter of a bottom plunger 17, so that the magnet is matched to the peripheral face of the plunger and forms a uniform, narrow gap 36 between the latter and the magnet.

As can be seen from FIG. 2, each permanent magnet 29 exerts a radially outwardly acting transverse force 28 on the bottom plunger 17 which is associated with it. This results in the plunger being seated with the radially outwardly pointing part of its peripheral face 33 against the outer region 38 of the plunger guide 21. The frictional force 39 which results therefrom and which acts on the plunger 17 in the direction of movement 27 thereof has a damping effect on the movement of the plunger and reliably prevents the latter from lifting off from the control cams 25 when the mold table rotates.

As force-generating damping elements, permanent magnets retain their magnetic force practically without limit, and are thus free from wear and are maintenance-free. In order to secure them in the transverse bore 30 they can therefore be permanently adhesively bonded therein without problems. It is also possible, however, to provide other suitable securing means for fixing the magnets if they are optionally to be replaced by other magnets with a greater or lesser magnetic force. It would be possible here, for example, to provide the magnets with an external screw thread and to screw them into transverse bores equipped with an internal screw thread, in which case they are advisedly not of concave form at their front ends 34 but are provided with a flat face.

The invention is not limited to the example of an embodiment which has been described and illustrated, but there is a multiplicity of modifications and variations which can be put into effect without departing from the spirit and scope of the invention. For example, it is possible to provide a magnet element 29' on the bottom plunger guide which is disposed below the bottom ends 23 of the bottom plungers 17 and which always pulls the bottom plungers firmly against the bottom control cam during their rotation with the mold table. Moreover, it can thereby easily be ensured that the bottom plungers do not lift off from the control cams, which would result in inaccuracies in the weight of the tablets to be produced.

Electromagnets can also be used instead of permanent magnets, and the force which these electromagnets exert on the plungers can easily be increased or decreased by altering the current flowing through the magnet coils. It is thereby possible easily to vary the frictional force acting on the plungers and thus to vary the degree of damping. It is also possible not to provide a separate magnet element in a transverse bore for each plunger, but to equip the bottom plunger guide ring with an encircling groove, the depth of which extends as far as the plunger guides and which comprises a magnet which is fixedly disposed in relation to the mold table and which exerts the requisite damping force on the plungers in the region of the inclined faces of the control cams 25.

I claim:

1. A rotary tablet press comprising:
   a rotating mold table;
   a plurality of top plungers, and
   a plurality of bottom plungers,
   said table comprising a plurality of molds and a plurality of plunger guides, and said top and bottom plungers being reciprocally movable in said guides coaxially with said molds,
   said press further comprising:
   a control cam located below said plunger guides for controlling said reciprocating movement of said bottom plungers, and
   one or more magnets located adjacent said plunger guides acting to urge said bottom plungers towards said plunger guides or said control cam for damping the movement of said bottom plungers.

2. A press according to claim 1, wherein each magnet acts on said bottom plungers transversely to the direction of movement thereof.

3. A press according to claim 1, wherein a separate magnet is provided for each said bottom plunger.

4. A press according to claim 1, wherein each magnet is a permanent magnet.

5. A press according to claim 1, wherein said mold table comprises at least one transverse opening extending to said plunger guides, each magnet being disposed in a respective transverse opening.

6. A press according to claim 1, wherein each said bottom plunger is spaced from a respective said magnet which acts thereon, whereby there is a gap therebetween.

7. A press according to claim 1, wherein each magnet has a front end, directed towards said bottom plungers, said front end having a shape matched to a shape of peripheral faces of said plungers.

8. A press according to claim 1, wherein each magnet comprises at least one electromagnetic element.

9. A press according to claim 7, wherein each magnet has a protruding stop collar at its end remote from the front end.

10. A press according to claim 5, wherein each magnet is detachably fastened in its respective transverse openings in said mold table.

11. A press according to claim 1, wherein each magnet is disposed between said plunger guide and said control cam and acts on respective bottom plungers in the direction of movement of said plunger.

12. A press according to claim 3, wherein each said bottom plunger has a transverse bore therein and each bottom plunger magnet is disposed in the transverse bores of said plungers.

\* \* \* \* \*